(12) United States Patent
Mauritsen et al.

(10) Patent No.: US 9,303,914 B2
(45) Date of Patent: Apr. 5, 2016

(54) LOW VIBRATION CRYOCOOLED SYSTEM FOR LOW TEMPERATURE MICROSCOPY AND SPECTROSCOPY APPLICATIONS

(71) Applicant: Montana Instruments Corporation, Bozeman, MT (US)

(72) Inventors: Luke R. Mauritsen, Belgrade, MT (US); Michael B. Simmonds, Bozeman, MT (US); Dan Griffing, Bozeman, MT (US)

(73) Assignee: Montana Instruments Corporation, Bozeman, MT (US)

( * ) Notice: Subject to any disclaimer, the term of this patent is extended or adjusted under 35 U.S.C. 154(b) by 0 days.

(21) Appl. No.: 14/297,561

(22) Filed: Jun. 5, 2014

(65) Prior Publication Data

US 2014/0338880 A1    Nov. 20, 2014

Related U.S. Application Data

(63) Continuation of application No. 12/749,501, filed on Mar. 29, 2010, now Pat. No. 8,746,008.

(60) Provisional application No. 61/164,448, filed on Mar. 29, 2009.

(51) Int. Cl.
*F25B 9/00* (2006.01)
*F25B 9/10* (2006.01)
(Continued)

(52) U.S. Cl.
CPC . *F25D 23/00* (2013.01); *F25B 1/10* (2013.01); *F25B 9/00* (2013.01); *F25B 9/002* (2013.01); *F25B 19/00* (2013.01); *F28F 21/085* (2013.01); *G01C 1/10* (2013.01); *G02B 21/28* (2013.01); *Y10T 29/49826* (2015.01)

(58) Field of Classification Search
CPC .............. F25B 19/00; F25B 9/00; F25B 9/10; F25B 9/14; F25B 9/145; F25B 9/12
USPC ........... 62/600, 510, 51.1, 6, 259.2, 628, 639, 62/657; 356/244, 246; 700/299, 300; 236/1 C, 91 D; 257/712, 716
See application file for complete search history.

(56) References Cited

U.S. PATENT DOCUMENTS 3,894,403 A    7/1975 Longsworth
3,929,516 A * 12/1975 Cheskis et al. ................ 148/681
(Continued)

OTHER PUBLICATIONS

G.K. White, The Thermal and Electrical Conductivity of Copper at Low Temperatures, Aug. 3, 1953, pp. 398-401.*
(Continued)

*Primary Examiner* — Frantz Jules
*Assistant Examiner* — Erik Mendoza-Wilkenfel
(74) *Attorney, Agent, or Firm* — Well St. John P.S.

(57) ABSTRACT

A vertical support rigidly mounted to a planar base positions and supports a cryocooler expander unit off axis and away from a sample to be examined. The sample support is likewise rigidly mounted to the planar base with a rigidly mounted sample housing therein. The cryocooler expander unit is suspended in the vertical support by spring dampening bearings. A pair of opposing flexible vacuum bellows connects the cryocooler expander unit to the sample housing and vertical support. This configuration isolates the sample from vibration. Flexible thermal links associated with a predictive electronic closed loop control sequence maintains sample temperature.

11 Claims, 3 Drawing Sheets

(51) Int. Cl.

| | |
|---|---|
| *F25B 9/12* | (2006.01) |
| *F25B 9/14* | (2006.01) |
| *F25D 23/00* | (2006.01) |
| *F25B 1/10* | (2006.01) |
| *F25B 19/00* | (2006.01) |
| *G01C 1/10* | (2006.01) |
| *F28F 21/08* | (2006.01) |
| *G02B 21/28* | (2006.01) |

(56) References Cited

U.S. PATENT DOCUMENTS

| | | | |
|---|---|---|---|
| 4,161,747 A | | 7/1979 | Jennings |
| 4,854,131 A | | 8/1989 | Sakitani et al. |
| 4,869,068 A | * | 9/1989 | Van Vloten ............... 62/51.1 |
| 5,327,733 A | | 7/1994 | Boolchand et al. |
| 5,613,367 A | | 3/1997 | Chen |
| 5,737,927 A | | 4/1998 | Takahashi et al. |
| 5,749,243 A | | 5/1998 | Lester |
| 6,196,005 B1 | | 3/2001 | Stautner |
| 8,114,321 B2 | | 2/2012 | Johnson |
| 2005/0126187 A1 | * | 6/2005 | Li et al. .................... 62/6 |
| 2005/0204748 A1 | | 9/2005 | Yamanaka et al. |
| 2006/0148276 A1 | * | 7/2006 | Renaudin ................ 439/1 |
| 2007/0234751 A1 | * | 10/2007 | Nagamune ............... 62/295 |
| 2009/0272127 A1 | | 11/2009 | Radovinsky et al. |
| 2010/0050661 A1 | * | 3/2010 | Snow et al. ............... 62/51.1 |

OTHER PUBLICATIONS

Alloy Digest, Mueller Copper 1100, Aug. 1983 Alloy Digest, ISSN:002-614X.*

Mueller Copper 1100 (Electrolytic Tough Pitch Copper), Alloy Digest, 1983, 2 pages.

White, G.K., "The Thermal and Electrical Conductivity of Copper At Low Temperatures", 1953, Pages 398-404.

\* cited by examiner

LOW VIBRATION CRYOCOOLED SYSTEM FOR LOW TEMPERATURE MICROSCOPY AND SPECTROSCOPY APPLICATIONS

CROSS REFERENCE TO RELATED APPLICATION

This application is a continuation of U.S. patent application Ser. No. 12/749,501, which was filed on Mar. 29, 2010, entitled "Low Vibration Cryocooled System for Low Temperature Microscopy and Spectroscopy Applications" which claims priority to U.S. Provisional Patent Application Ser. No. 61/164,448 filed Mar. 29, 2009, the entirety of each of which is incorporated by reference herein.

BACKGROUND

The present invention relates to systems and methods for cryogenic research. More particularly, the present invention relates to systems and methods for microscopy and spectroscopy of cryocooled samples.

Problems associated with low temperature microscopy are many. The cooling systems cause sample vibration, maintaining a constant temperature of the sample is likewise a challenge. There have been attempts to address these problems (see, for example, U.S. Pat. Nos. 3,894,403; 4,161,747; 4,854,131; 4,869,068; 5,327,733; and 5,749,243) yet no solution provides a reliable system that supports a sample without vibration and maintains sample temperature.

A need remains for a system that effectively isolates a cryocooled sample from vibration of the cooling system while maintaining the sample at a steady temperature.

All patents, patent applications, provisional patent applications and publications referred to or cited herein, are incorporated by reference in their entirety to the extent they are not inconsistent with the teachings of the specification

BRIEF SUMMARY OF THE INVENTION

A purpose of the invention is to provide vibration isolated sample mounting for microscopy and spectroscopy of a cryocooled sample. One advantage of preferred embodiments of the invention is that they provide a low vibration, low temperature fluctuating cryocooled sample environment that allows optical access from the top, sides and bottom for microscopy and spectroscopy applications. Another advantage of preferred embodiments of the invention is the achievement of isolation from cryocooler vibrations to the sample and the optics bench, as well as maintaining virtually the same low temperature and heat removal capacity (at the isolated cryocooled sample) of the cryocooler. Another advantage of preferred embodiments of the invention is that it separates the cryocooler assembly and the sample housing assembly into two distinct units that may be easily connected and disconnected. The advantage of this modular architecture is that one cryocooled system can easily connect with a variety of modular application-specific sample areas, each with the same high level of automation, computer control, and mechanical and electronic integration into the whole cryocooled system. Another advantage of preferred embodiments of the invention is that the user may sweep the sample temperature from less than 4 Kelvin (K) to over 300K without turning off the cryocooler. Another advantage of preferred embodiments of the invention is that thermal fluctuations of the cryocooler are significantly reduced with very little rise in the temperature of the sample.

A preferred embodiment of the apparatus comprises a cryocooled sample housing which rigidly connects the cryocooled sample to an optics bench off-axis and a distance away from a cryocooler expander unit such that optical access to the sample is allowed from above, below, and from the sides. This preferred embodiment of the apparatus preferably also includes a closed-cycle cryocooler which is supported separately from the sample chamber by spring-damping supports and connected to the sample chamber by highly conductive small cross-section flexible thermal straps and a small diameter flexible bellows which is opposed by a second bellows opposite the cryocooler so there is no net force on the cryocooler assembly resulting from the pressure differential caused by the hermetic sealing bellows under vacuum. The temperature of the cooled sample is preferably controlled by using a highly predictive and adaptive electronic closed loop control sequence. In use, the invention is preferably operated by a scientist, researcher, student or other person involved in the study of a cryocooled sample by optical techniques such as microscopy and spectroscopy.

In a preferred embodiment, the invention is an apparatus comprising:

a sample housing having a plurality of optical ports;

a sample support that is rigidly mounted within said sample housing;

an expander unit having a body and a heat conductive arm having a first portion and a second portion;

a rigid support that supports said expander;

a first flexible bellows that enshrouds said first and second portions and extends between a second flexible bellows that opposes the force on the first said bellows caused by vacuum pressure inside first said bellows;

a plurality of flexible thermal links, each of said flexible thermal links comprising a plurality of strips of oxygen annealed copper having a first ending and a second ending;

a flange to which one ending of each of said flexible thermal links is attached, said flange being rigidly attached to said sample support;

a flange to which each of said first endings is attached, said flange being in thermal communication with said second portion.

Preferably, said plurality of strips of oxygen annealed copper are spaced from one another.

Preferably, said plurality of strips of oxygen annealed copper are spaced about 0.01 inches from one another at their mid points.

Preferably, each of said plurality of strips of oxygen annealed copper has a cross section of about 0.0005 inches squared.

In another preferred embodiment, the invention is a method of inspecting a sample in a low temperature environment, said method comprising:

placing the sample on a sample support that is enclosed in a sample housing and that is in thermal communication with a flange, said sample housing having a plurality of ports along a plurality of orthogonal axes;

using an expander to cool a heat conductive arm having two portions to temperatures of about 4 degrees Kelvin and 30 degrees Kelvin;

enshrouding both portions of said heat conductive arm within a first bellows that extends from a sample housing to said expander which is supported on a rigid support with spring damping elements;

second bellows extends from said expander to rigid support in alignment with first said bellows and opposing the force of first said bellows caused by vacuum inside first said bellows;

connecting said second portion of said heat conductive arm to said flange by means of a flange that is in thermal communication with said second portion and a plurality of strips of oxygen annealed copper that are spaced from one another and that are in thermal communication with said flanges.

Preferably, said method further comprises: interrogating the sample through at least one of said ports using a laser or another electromagnetic energy propagation device.

Preferably, said method further comprises: observing the sample a through at least one of said ports using a microscope or another imaging device.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

DRAWINGS

The features of the invention will be better understood by reference to the accompanying drawings which illustrate presently preferred embodiments of the invention. In the drawings.

Figure 1:
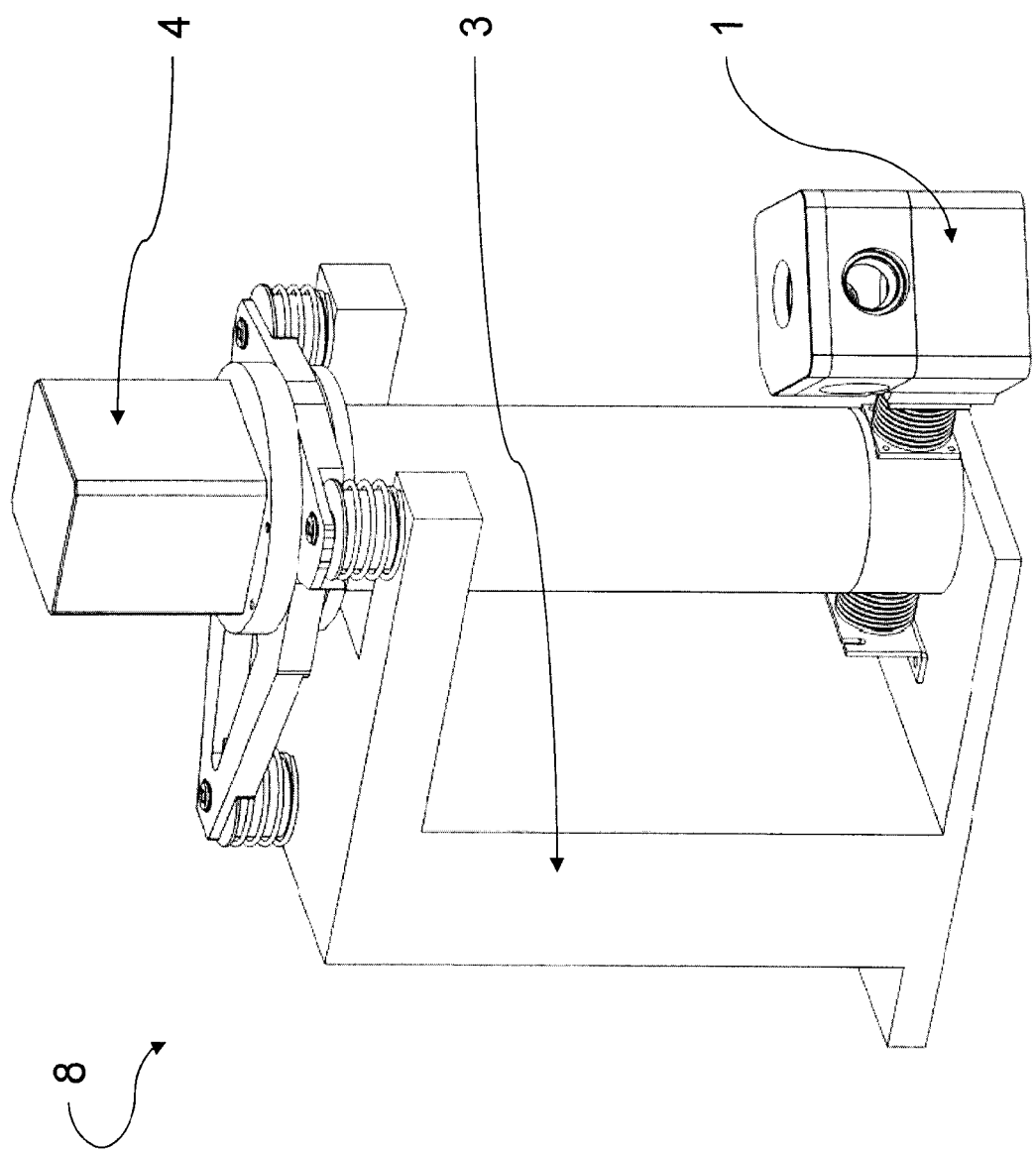
FIG. 1 is a side perspective view of a preferred embodiment of a low vibration cryocooled system for low temperature microscopy and spectroscopy of the subject invention.

The following reference numerals are used to indicate the parts and environment of the invention on the drawings:

1 Cryocooled sample housing, separately aligned sample housing, sample housing
2 Flexible vacuum bellows, small diameter flexible hermetic sealing bellows
3 Rigid support
4 Cryocooler expander unit, closed-cycle cryocooler expander unit
5 Spring damping supports
6 Top optical access port
7 Side optical access ports
8 Low vibration optical cryocooled apparatus, low vibration cryocooled system for low temperature microscopy and spectroscopy
9 Highly conductive small cross-section flexible thermal straps, highly conductive flexible thermal links, highly conductive thermal links, links, highly conductive flexible strap, flexible thermal strap
10 Bottom optical access port
11 Cryogenic support, rigid cryogenic support, rigid support, sample support
12 Optical bench
13 Separate flexible hermetic sealing bellows
14 Temperature sensor
15 Heater

DESCRIPTION

This disclosure is submitted in furtherance of the constitutional purposes of the U.S. Patent Laws "to promote the progress of science and useful arts" (Article 1, Section 8).

Figure 2:
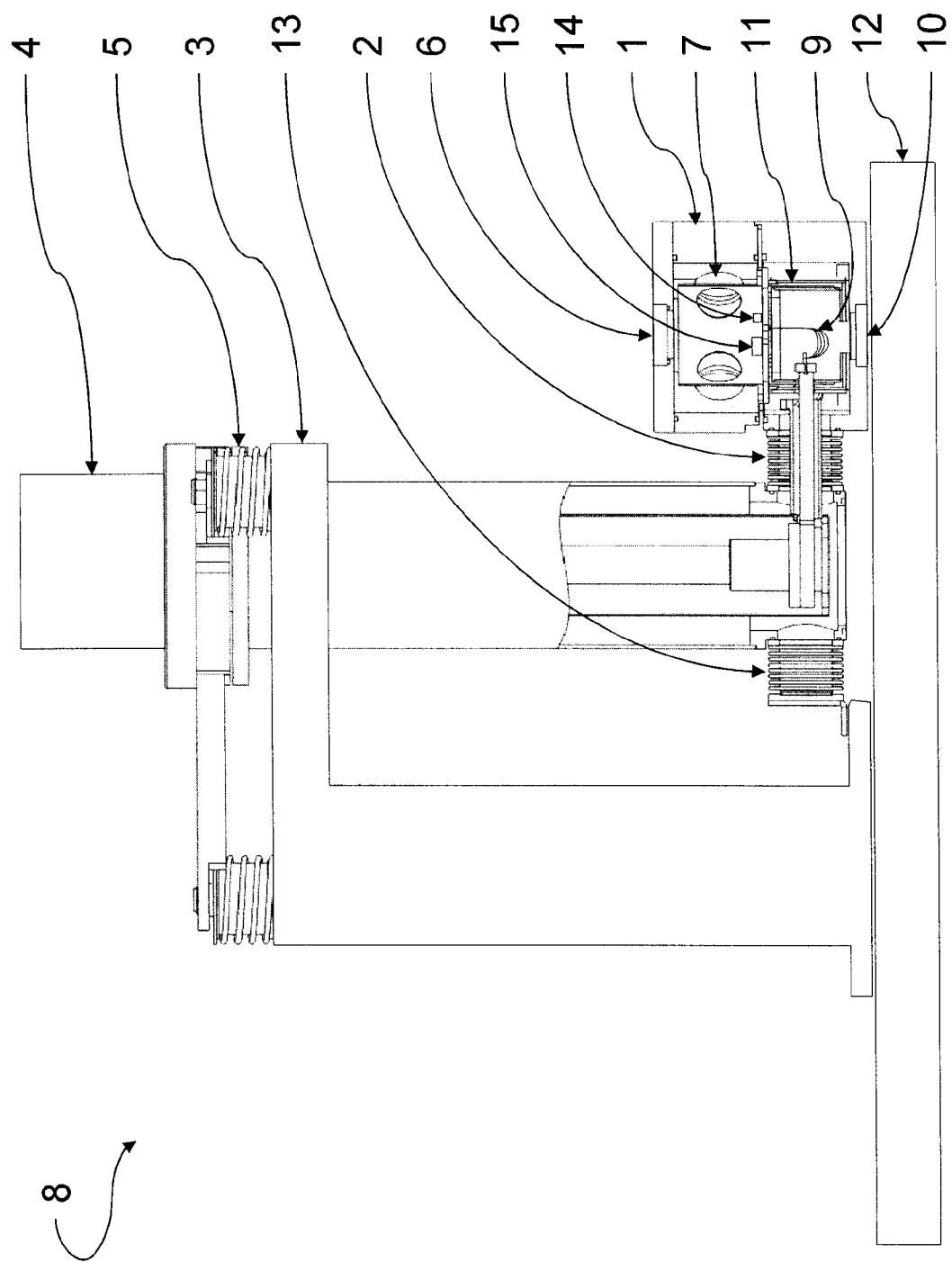
FIG. 2 is a side elevational view of the low vibration cryocooled system for low temperature microscopy and spectroscopy of FIG. 1 with a cutaway side view of the lower section.
Figure 3:
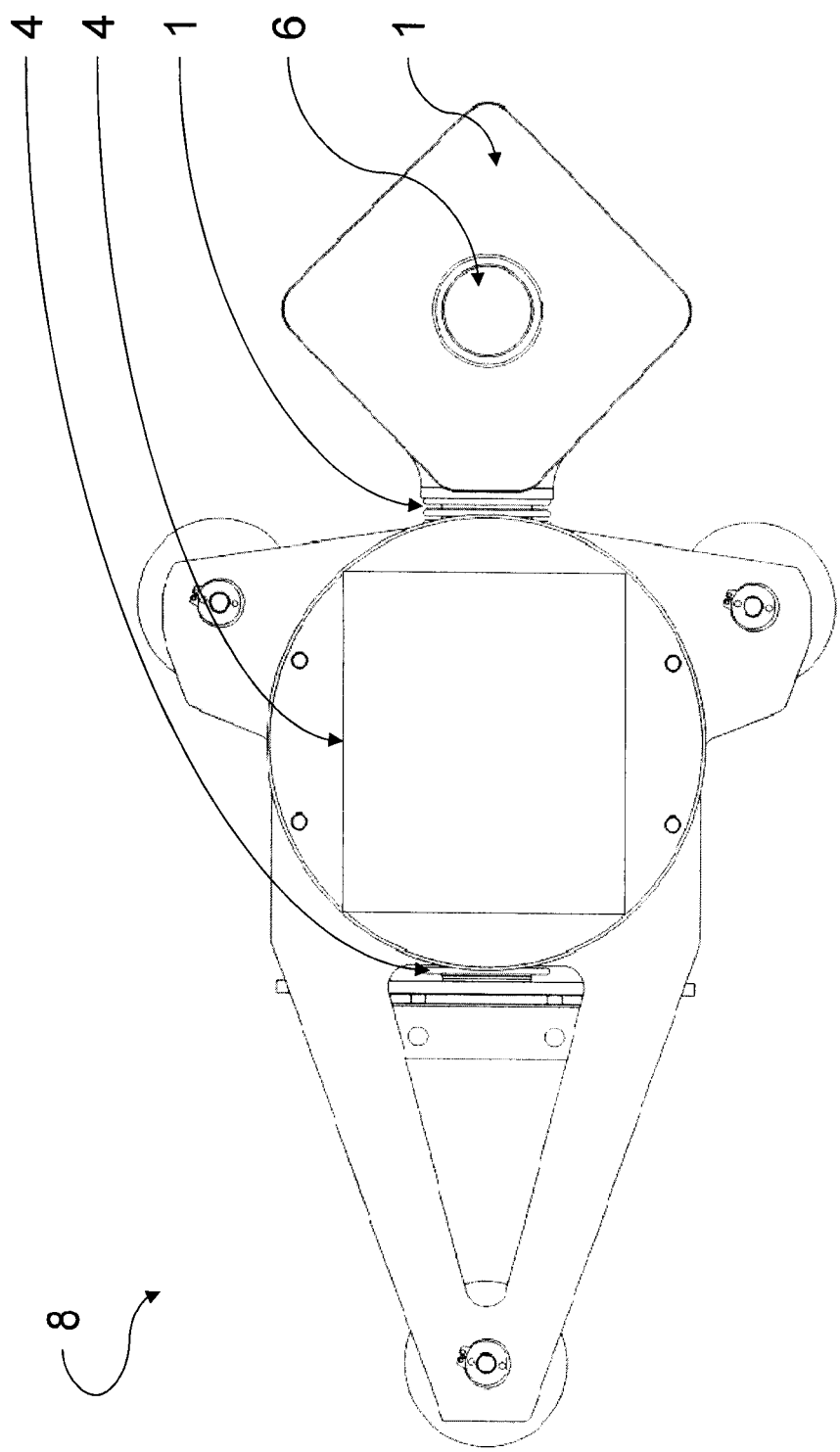
FIG. 3 is a top plan view of the low vibration cryocooled system for low temperature microscopy and spectroscopy of FIG. 1.

Referring now to a preferred embodiment of the invention in more detail, in FIGS. 1-3 there is shown a low vibration cryocooled system for low temperature microscopy and spectroscopy 8 having a rigid support 3 which supports a closed-cycle cryocooler expander unit 4, by several spring dampers 5. In a more preferred embodiment, cryocooler expander unit 4 is a Sumitomo Heavy Industries RDK-1 OID cryocooler. The cryocooler expander unit 4 is preferably connected to separately aligned sample housing 1 and cryogenic sample support 11 by a small diameter flexible hermetic sealing bellows 2 and highly conductive flexible thermal links 9. The diameter of flexible hermetic sealing bellows 2 is preferably in the range from about 0.75 inches to about 3 inches and is more preferably in the range from about 1 inch to about 1.25 inches.

In normal use, both the rigid support 3 and the sample housing 1 rest on an optical bench 12 or on another rigid plane. In a more preferred embodiment, optical bench 12 is a Newport air isolated workstation. Optical access to the cryocooled sample inside the sample housing 1 is through the top optical access port 6 and/or through the side access ports 7 and/or through the bottom access port 10. The sample is preferably supported by a rigid cryogenic support 11 which holds the sample in a fixed location relative to the optical bench 12 or rigid plane on which the invention rests. The cryocooler is also preferably attached to the rigid support 11 by a separate flexible hermetic sealing bellows 13 that is in alignment with flexible vacuum bellows 2. A temperature sensor 14 and a heater 15 are preferably located on the cryogenic support 11 near the sample to allow for an adaptive feedback loop to reduce temperature fluctuations. In a more preferred embodiment, temperature sensor is a Cernox temperature sensor from Lakeshore Cryogenics Inc.

In more detail, the low vibration cryocooled system for low temperature microscopy and spectroscopy 8 allows a sample to be cryogenically cooled and rigidly mounted to the optics bench 12 and aligned separately (situated a distance away) from the axis of the cryocooler expander unit 4 such that top access to the sample housing 1 via top access port 6 may be achieved. This unique configuration in which the sample is located off axis from and a distance away from the cryocooler expander unit 4 reduces sample vibration by isolating the sample. The pair of flexible vacuum bellows 2 and 13 which connect the cryocooler expander unit 4 to the sample housing 1 and to the rigid support 3 are preferably aligned along a common axis and opposed to one another such that when there is a differential pressure on the inner and outer surfaces of the bellows 2, there is no net force imposed on the cryocooler expander unit 4.

The highly conductive flexible thermal links 9 of the subject invention are made with a small cross section of thin oxygen annealed copper strips. In a preferred embodiment, about 2 to 4 highly conductive flexible thermal links 9 are used. The cross section and length of each of the highly conductive flexible thermal links 9 is preferably in the range from about 0.003 inches squared to about 0.03 inches squared with lengths in the range of 1 inch to 4 inches long. In a preferred embodiment the flexible thermal links are annealed at high temperature in the presence of oxygen. In a more preferred embodiment the flexible thermal links are annealed at a temperature ranging from 700 degrees C. to 1000 degrees C. and for 5 hours to 20 hours in duration with a pressure range from 100 milli-Torr to 0.5 milli-Torr.

In a particularly preferred embodiment of the invention a highly conductive flexible strap which comprises multiple thin strips of oxygen annealed high purity copper melted together at each end and formed into an adjoining copper flange. By "thin," the applicants mean preferably no more than about 0.01 inches in thickness. By "high purity," the applicants mean preferably at least 99% pure copper and more preferably at least 99.99% pure copper. The thin copper strips are preferably bonded with the copper flange together by welding in a controlled atmosphere absent of the presence of oxygen to avoid oxidation on the surfaces of the copper, and subsequently annealed in the presence of oxygen to promote increased thermal conductivity at cryogenic temperatures. The multiple thin strips of high purity copper are stacked together such that a small gap at the midpoint of the straps exists between each thin layer which together makes up one flexible thermal strap 9. By "small gap," the applicants mean that the gap is preferably no larger than about 0.1 inches and more preferably no larger than about 0.01 inches units. Each flexible thermal strap 9 connects the cooled portions of the cryocooler expander unit 4 to the cryogenic support 11 such that each strap 9 efficiently transfers heat from one end to the other of strap 9 with a small (defined above) cross-sectional area while transferring a only a small force from one end to the other of strap 9. The flexible straps are connected to the various temperature stages such that they transfer heat to the various temperature stages of the cryocooler expander unit.

The highly conductive thermal links 9 of preferred embodiments of the subject invention transmit significantly less vibrations to the sample than the currently used copper braid-type links and transmit significantly more heat than the previous gas-filled envelope thermal link. Prior thermal links cause the cryocooled system to either transmit significant vibrations of more than 1,000 nanometers in amplitude to the sample, or cause the sample to be maintained at temperatures above 5 degrees Kelvin when the cryocooler expander unit is cooled to less than 4 degrees Kelvin.

Previous systems do not teach any way to cycle a cooled sample over a large temperature range while keeping the cryocooler running. Since in preferred embodiments, the thermal links 9 of the present invention are oxygen annealed and highly heat conductive at low temperatures (by "low" temperatures, the applicants mean below 5 degrees Kevin), they are small in cross-section and have a large heat conductivity peak only at low temperatures near 10 degrees Kelvin. Above 10 degrees Kelvin, there is a decreasing thermal conductivity of the links 9, which means that as heat is applied to the sample, the sample rises in temperature without transferring much of that heat to the running cryocooler (not shown).

The cold stage of a closed-cycle cryocooler fluctuates in temperature due to the cyclical alternating pressure of the cooled Helium gas with each cycle of gas entering and exiting the expander section of the cryocooler. Additionally, the parasitic and active heat loads on the cryocooler cause the cold stage to rise in temperature between each cycle. Typically the way to minimize thermal fluctuations in cryogenic systems is to use a PID control loop, however this method results in an unnecessary amount of heat input to the system, which significantly raises the cold stage temperature.

Temperature fluctuations can be reduced using a predictive electronic control loop which uses the frequency, amplitude, and phase of previous fluctuations to minimize future fluctuations. In a preferred embodiment, the present invention uses a temperature sensor 14 and a heater 15 located near (by "near," the applicants mean located on the same temperature platform and within 2 inches) the sample on the cryogenic support 11 such that temperature can be read by an electronic device for data acquisition.

Specifically, the cryocooler is operated manually until the cryogenic support 11 has reached a stable temperature near the desired measurement temperature as measured by the temperature sensor 14. At that time the temperature profile of at least one cycle of the cryocooler is recorded. Based on this initial, uncontrolled temperature profile, a profile of heater values which is inversely proportional to the recorded temperature profile is applied using heater 15 synchronously with the cryocooler cycle and adjusted for phase relative to the cryocooler cycle to optimize the temperature minimization.

A second phase of optimization of the heater profile is obtained by measuring the residual cyclical temperature variation of each value of the heater profile with sensor 14. A correction factor to each value of the heater profile is applied using heater 15 that is proportional to each measured residual value.

The invention involves using a laser, optics and a microscope to interrogate and observe a cooled sample, all of which are supported by a common optics bench. Operation of the invention involves cooling the cryocooler expander unit 4 to cryogenic temperatures and using the optical apertures 6, 7 and/or 10 for observation of the sample using microscopes or other imaging devices and interrogation of the sample using lasers or other electromagnetic energy propagation devices along with detection of signals returned by the interrogated sample.

Many variations of the invention will occur to those skilled in the art. Some variations include an inverted cryocooler expander unit 4 such that it would be located underneath the optics bench 12 and extend up through a hole in the optics bench, or extend up over the edge of the optics bench 12. Other variations call for the cryocooler expander unit 4 being supported by structure separate from the optics bench 12 where the sample housing 1 is located. Additionally, the environment surrounding the sample may be altered or changed by adding a magnetic field, high pressure, RF field, or other types of environmental alterations. All such variations are intended to be within the scope and spirit of the invention.

Although some embodiments are shown to include certain features, the applicants specifically contemplate that any feature disclosed herein may be used together or in combination with any other feature on any embodiment of the invention. It is also contemplated that any feature may be specifically excluded from any embodiment of the invention.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A conductive bundle of flexible thermal links extending between a heat conductive arm and a thermal sample support of an apparatus for low temperature microscopy and/or spectroscopy, the bundle comprising a plurality of adjacent links, each individual link of the plurality extending from a first end to a second end, wherein the first ends of the links extend and are coupled to one another to form a first flange and the second ends of the links extend and are also coupled to one another to form a second flange, single empty spaces being defined between the individual adjacent links to form the conductive bundle having a plurality of continuous single empty spaces without interruption between the plurality of adjacent links and between the first and second flanges, wherein the first flange is coupled to the heat conductive arm and the second flange is coupled to the thermal sample support.

2. The conductive bundle of claim 1 wherein the links are stacked above each other.

3. The conductive bundle of claim 1 wherein the single space between the individual adjacent links is from about 0.01 inches to about 0.1 inches in one cross section.

4. The conductive bundle of claim wherein each of the individual adjacent links define upper and opposing lower surfaces with edges extending between the surfaces, the individual adjacent links being stacked above each other within the bundle to provide a lower surface of one link opposing the upper surface of an adjacent link.

5. The conductive bundle of claim 1 wherein in at least one lateral cross section each of the individual adjacent links is from about 0.0003 inches squared to about 0.03 inches squared.

6. The conductive bundle of claim 1 wherein each of the individual adjacent links is from about 1 inch to about 4 inches.

7. The conductive bundle of claim 1 wherein the bundle comprises at least 2 individual adjacent links.

8. The conductive bundle of claim 1 wherein each of the individual adjacent links is annealed copper.

9. The conductive bundle of claim 8 wherein each of the individual adjacent links is oxygen annealed copper.

10. The conductive bundle of claim 8 wherein the copper of the individual adjacent links is high purity copper.

11. The conductive bundle of claim 10 wherein the copper of the individual adjacent links is at least 99% pure copper.

\* \* \* \* \*